(12) United States Patent
Miyake

(10) Patent No.: US 7,869,633 B2
(45) Date of Patent: Jan. 11, 2011

(54) PERSON IMAGE RETRIEVAL APPARATUS

(75) Inventor: Izumi Miyake, Asaka (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 12/292,989

(22) Filed: Dec. 2, 2008

(65) Prior Publication Data
US 2009/0092295 A1 Apr. 9, 2009

Related U.S. Application Data

(63) Continuation of application No. 11/148,350, filed on Jun. 9, 2005, now Pat. No. 7,545,983.

(30) Foreign Application Priority Data
Jun. 10, 2004 (JP) ............... 2004-172176

(51) Int. Cl.
G06K 9/00 (2006.01)
G06K 9/46 (2006.01)

(52) U.S. Cl. .................. 382/118; 382/195
(58) Field of Classification Search .......... 382/118, 382/181; 700/100
See application file for complete search history.

(56) References Cited

U.S. PATENT DOCUMENTS

| 5,487,140 A | * | 1/1996 | Toya ............... 345/641 |
| 5,600,767 A | | 2/1997 | Kakiyama et al. |
| 6,615,093 B1 | | 9/2003 | Chung et al. |
| 7,194,109 B2 | | 3/2007 | Nakamura et al. |
| 2004/0008873 A1 | | 1/2004 | Sogo et al. |

FOREIGN PATENT DOCUMENTS

| JP | 2003-178304 | * | 12/2002 |
| JP | 2003-178304 | * | 6/2003 |

* cited by examiner

Primary Examiner—Vu Le
Assistant Examiner—Amara Abdi
(74) Attorney, Agent, or Firm—McGinn IP Law Group, PLLC

(57) ABSTRACT

According to the present invention, face parts to be compared are set by the comparison target setting section based on the number of images of a group of search target images. Then, a retrieval target image and each image of the group of search target images is compared by the set face parts. An image with a particular correlation is determined to be a similar image and retrieved from the group of images to be compared. Thereby, it is possible to perform quick retrieval based on the number of images of the group of search target images.

9 Claims, 6 Drawing Sheets

PERSON IMAGE RETRIEVAL APPARATUS

The present application is a Continuation application of U.S. patent application Ser. No. 11/148,350 filed on Jun. 9, 2005; now U.S. Pat. No. 7,545,983 which is based on Japanese patent application No. 2004-172176, the entire contents of which are incorporated herein by reference.

BACKGROUND OF THE INVENTION

1. Field of the Invention

The present invention relates to a person image retrieval apparatus, and in particular to a person image retrieval apparatus which retrieves an image in which the same person shown in a retrieval target image is shown, from a group of search target images.

2. Related Art

There have been proposed various types of apparatuses which retrieve an image in which a particular person is shown from a group of search target images. For example, in Japanese Patent Application Laid-open No. 2003-178304, there is proposed a face image retrieval apparatus which suppresses the amount of computation by detecting a person's face area from a taken face image, extracting parts of the face such as eyes and a mouth based on the detection result, extracting characteristics of the face based on the extraction result, and evaluating the degree of similarity to registered face images held in a database.

SUMMARY OF THE INVENTION

However, since the face image retrieval apparatus of Japanese Patent Application Laid-open No. 2003-178304 extracts characteristics of multiple parts such as eyes, a nose, a mouth and the like to evaluate the degree of similarity to face images to be compared and, therefore, has a disadvantage that a longer time is required for retrieval as the number of face images to be compared increases.

The present invention has been made in consideration of the above situation, and its object is to provide a person image retrieval apparatus capable of quick retrieval.

In order to achieve the object, a first aspect of the present invention provides a person image retrieval apparatus which retrieves an image in which the same person shown in a retrieval target image is shown, from a group of search target images, the person image retrieval apparatus comprising: a search target detection section which detects number of images of the group of search target images; a comparison target setting section which sets face parts to be compared based on the number of images of the group of search target images detected by the search target detection section, the comparison target setting section setting fewer face parts to be compared as the number of images of the group of search target images is larger; a comparison/determination section which compares the face of the person shown in the retrieval target image and the face of the person shown in each image of the group of search target images by the parts set by the comparison target setting section and determines an image with a particular correlation to be a similar image; and an output section which outputs the image determined by the comparison/determination section to be a similar image on a display device.

According to the first aspect, face parts to be compared are set by the comparison target setting section based on number of images of a group of search target images. Then, a retrieval target image and each image of the group of search target images is compared by the set face parts. An image with a particular correlation is determined to be a similar image and retrieved from the group of images to be compared. Thereby, it is possible to perform quick retrieval based on the number of images of the group of search target images.

In order to achieve the above object, a second aspect of the present invention provides a person image retrieval apparatus which retrieves an image in which the same person shown in a retrieval target image is shown, from a group of search target images, the person image retrieval apparatus comprising: a comparison target setting section which sets face parts to be compared; a comparison/determination section which compares the face of the person shown in the retrieval target image and the face of the person shown in each image of the group of search target images by the parts set by the comparison target setting section and determines an image with a particular correlation to be a similar image; an output section which outputs the image determined by the comparison/determination section to be a similar image on a display device; and a re-retrieval instruction section which instructs re-retrieval, wherein the comparison target setting section adds and sets a face part to be compared when re-retrieval is instructed by the re-retrieval instruction section.

According to the second aspect, the face of a person shown in a detection target image and the face of a person in each image of a group of search target images are compared by face parts set by the comparison target setting section. An image with a particular correlation is determined to be a similar image and retrieved from the group of search target images. If re-retrieval is instructed by the re-retrieval instruction section, a face part to be compared is additionally set by the comparison target setting section, and re-retrieval is performed. Thereby, it is possible to quickly retrieve a result which can satisfy the user.

According to a person image retrieval apparatus of the present invention, it is possible perform quick retrieval.

DETAILED DESCRIPTION OF THE PREFERRED EMBODIMENTS

Description will be made below on preferred embodiments for implementing a person image retrieval apparatus of the present invention, with reference to accompanying drawings.

Figure 1:
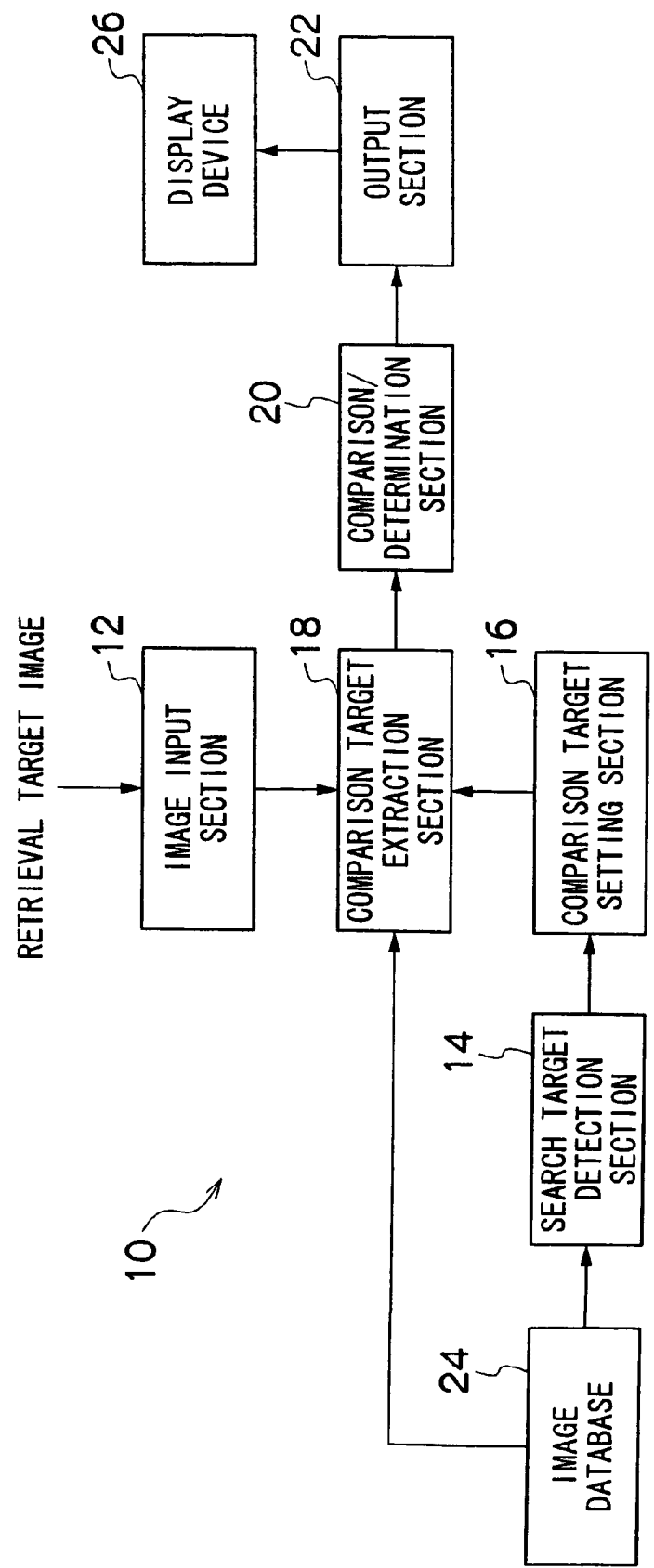
FIG. 1 is a block diagram showing the configuration of a person image retrieval apparatus of a first embodiment.

FIG. 1 is a block diagram showing a first embodiment of a face image retrieval apparatus according to the present invention. As shown in FIG. 1, a face image retrieval apparatus 10 of the first embodiment is configured by an image input section 12, a search target detection section 14, a comparison target setting section 16, a comparison target extraction section 18, a comparison/determination section 20 and an output section 22, and realized, for example, by a personal computer in which a predetermined program is incorporated.

The image input section 12 inputs a retrieval target image. Here, the retrieval target image is person image data in which a person to be retrieved is shown, and supplied, for example, by a digital camera or an auxiliary storage device connected to the face image retrieval apparatus 10.

The search target detection section 14 detects number of images of a group of search target images (number of images included in the group of search target images). The group of search target images is a collection any image data with or without a person therein, and is stored in an auxiliary storage device connected to the face image retrieval apparatus 10 or a data server connected via a network, for example, as an image database 24.

The comparison target setting section 16 sets face parts to be compared, based on the number of images of the group of search target images which has been detected by the search target detection section 14. In this case, if 10,000 or more images are included in the group of search target images, then "eyes" is set as a comparison target. If 9,999 to 1,000 images are included, then "eyes" and "mouth" are set as comparison targets, and if 999 to 100 images are included, then "eyes", "mouth" and "nose" are set as comparison targets.

The comparison target extraction section 18 detects a person's face area from each of the retrieval target image inputted by the image input section 12 and the images (the search target images) stored in the image database 24 and extracts the face parts set by the comparison target setting section 16 therefrom.

The face area is detected by acquiring pixels with a color similar to the color specified as the skin color, from an original image, and setting the acquired area as the face area. This processing is performed, for example, by specifying a range of the skin color on a color space for differentiating the skin color from other colors, from information about the skin color for which sampling has been performed beforehand, and determining whether or not the color of each pixel is included within the specified range.

Extraction of eyes, one of face parts, is performed, for example, by detecting areas with a luminance value lower than that of the face area, from within the detected face area. Extraction of a mouth is performed, for example, by detecting an area with a luminance value lower than that of the face area from within an area below the extracted eyes. Extraction of a nose is performed by roughly identifying an area of the nose between the eyes and the mouth and performing horizontal edge enhancement for the area. Then, horizontal projection of luminance values is performed for the obtained image, and the position with the lowest luminance value is determined as the position of the nose.

The comparison/determination section 20 compares the face parts of the retrieval target image which have been extracted by the comparison target extraction section 18 with the face parts of the search target images, and determines an image with a predetermined correlation as a similar image. That is, correlation values are determined by correlating the face parts of the retrieval target image and the face parts of the search target images. Then, an image with a correlation value in a predetermined range is determined as a similar image. For example, if "eyes" and "mouths" are extracted by the comparison target extraction section 18, a correlation value between the "eyes" of the retrieval target image and the "eyes" of a search target image and a correlation value between the "mouth" of the retrieval target image and the "mouth" of the search target image are determined. Then, if the correlation values for both of "eyes" and "mouths" are in the predetermined range, then the search target image is determined as a similar image.

The output section 22 outputs the search target image determined as a similar image by the comparison/determination section 20 to a display device 26.

Figure 2:
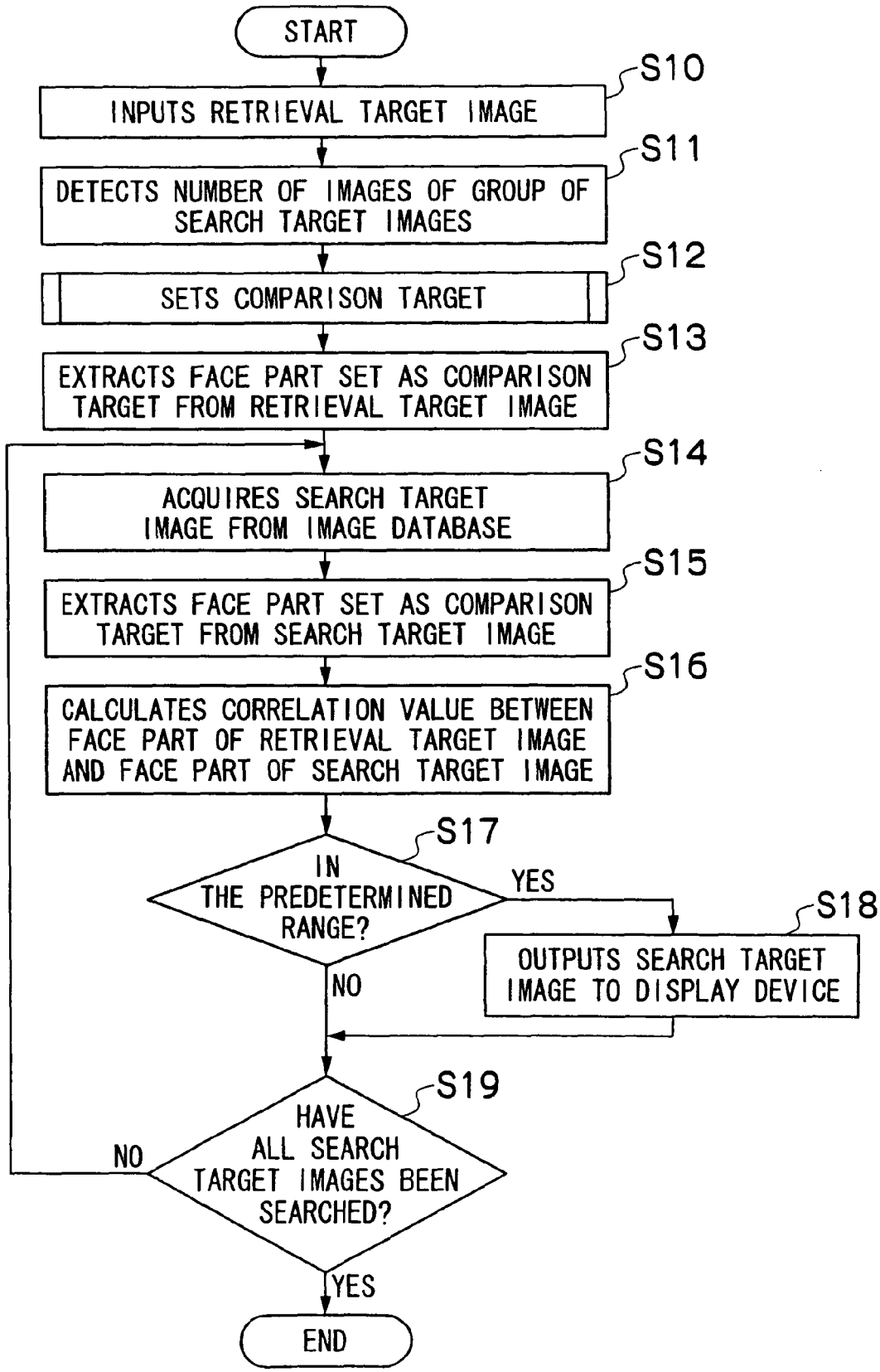
FIG. 2 is a flowchart showing the procedure of a retrieval process in the person image retrieval apparatus of the first embodiment.

Description will be now made on the procedure of a retrieval process to be performed by the face image retrieval apparatus 10 of the first embodiment which is configured as described above, with reference to the flowchart shown in FIG. 2.

First, a retrieval target image is inputted by the image input section 12 (step S10). The retrieval target image may be an image taken by a digital camera and acquired. Alternatively, a particular image may be selected from among images stored in an auxiliary storage device and acquired as the retrieval target image.

When the retrieval target image is inputted, the number of images of a group of search target images is detected by the search target detection section 14 (step S11). Since the group of search target images is provided as the image database 24 as described above, the search target detection section 14 accesses the image database 24 to detect the number of images of the group of search target images.

When the number of images of the group of search target images is detected, a face part to be compared is set by the comparison target setting section 16 based on the detected number of images of the group of search target images (step S12).

Figure 3:
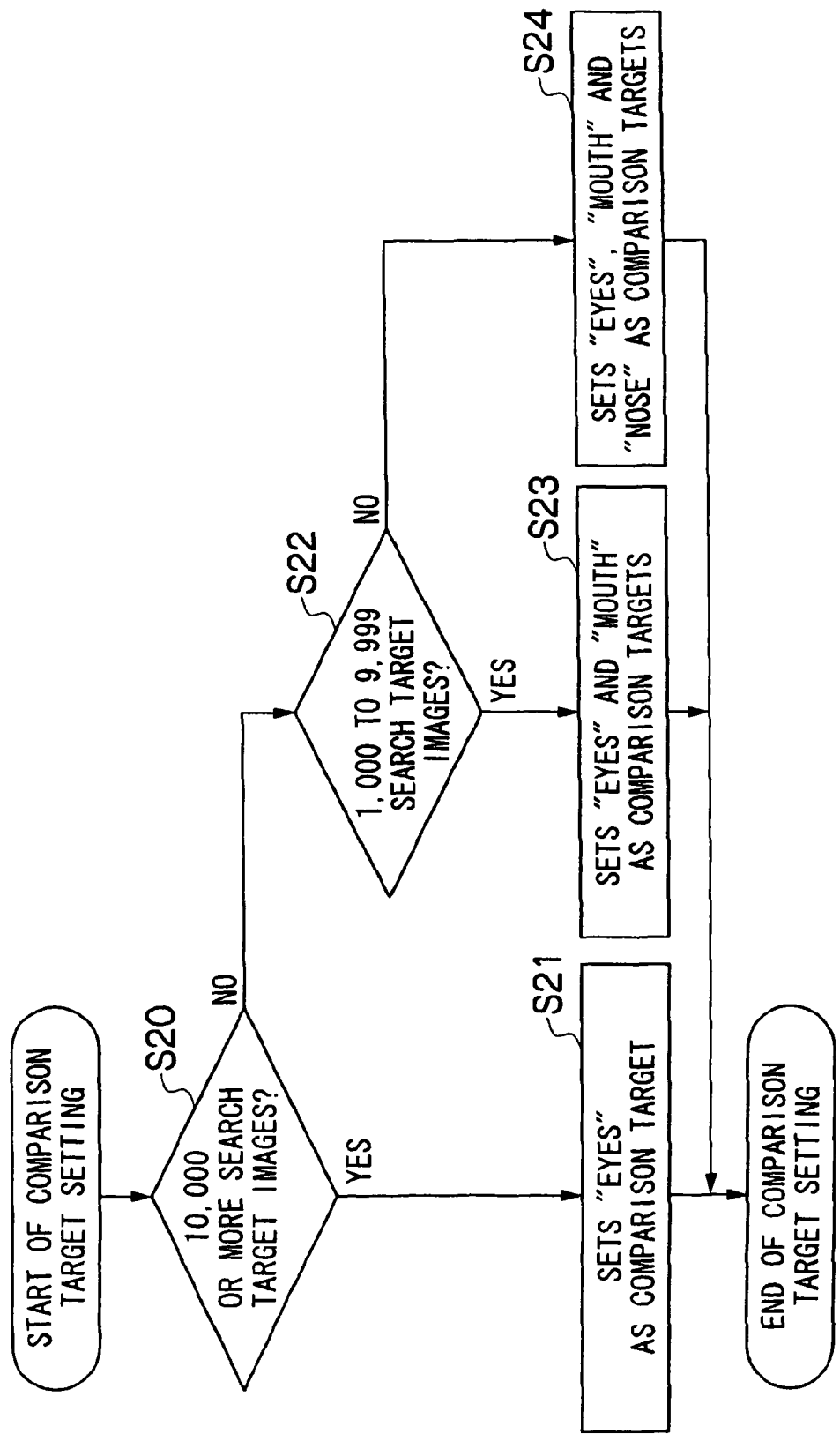
FIG. 3 is a flowchart showing the procedure of a comparison target setting process in the person image retrieval apparatus of the first embodiment.

FIG. 3 is a flowchart showing the procedure of a comparison target setting process. First, it is determined whether or not the detected group of search target images includes 10,000 or more images (step S20). If the detected group of search target images is determined to include 10,000 or more images, then "eyes" is set as a comparison target (step S21). On the contrary, if the detected group of search target images is determined not to include 10,000 or more images, then it is determined whether or not the detected group of search target images includes 1,000 to 9,999 images (step S22). If the detected group of search target images is determined to include 1,000 to 9,999 images, then "eyes" and "mouth" are set as comparison targets (step S23). If the detected group of search target images is determined not to include 1,000 to 9,999 images, then the group of search target images is determined to include less than 1,000 images, and "eyes", "mouth" and "nose" are set as comparison targets (step S24). As described above, face parts to be compared are set.

When the face parts to be compared have been set, the face parts set as comparison targets are extracted from the inputted retrieval target image by the comparison target extraction section 18 (step S13). For example, if "eyes" is set as a comparison target, then an image of "eyes" is extracted from the retrieval target image. If "eyes" and "mouth" are set, images of "eyes" and "mouth" are extracted from the retrieval target image.

Then, the first search target image is acquired from the image database 24 (step S14), and the face parts set as comparison targets are extracted from the acquired search target image by the comparison target extraction section 18 (step S15).

When the face parts to be compared have been extracted from the search target image, the extracted face parts of the search target image are compared with the face parts extracted from the retrieval target image, and it is determined whether or not both are similar to each other. That is, a correlation value between a face part extracted from the search target image and a face part extracted from the retrieval target image is calculated (step S16), and it is determined by the comparison/determination section 20 whether or not the correlation value is in a predetermined range (step S17).

As a result, if it is determined that the correlation values between the face part extracted from the search target image and the face part extracted from the retrieval target image are in the predetermined range, then both are determined to be similar images, and the search target image determined to be a similar image is outputted from the output section 22 and displayed on the display device 26 (step S18). On the contrary, if it is determined that the correlation values between the face part extracted from the search target image and the face part extracted from the retrieval target image are not in the predetermined range, then both are determined to be non-similar images, and the process proceeds to the next step without displaying an image.

As described above, if a search target image is determined to be similar to the retrieval target image, then the search target image is outputted to the display device 26. After that, it is determined whether all the images in the image database have been searched or not (step S19). If it is determined that all the images have been searched, then the process ends.

On the contrary, if it is determined that all the images have not been searched yet, then the process returns to step S14, where the next search target image is acquired and the above similarity comparison/determination process is performed.

Thus, according to the face image retrieval apparatus 10 of the first embodiment, comparison targets are set based on the number of images of a group of search target images, and therefore an intended image can be always retrieved within a particular time irrespective of the number of images of a group of search target images.

Though "eyes", "mouth" and "nose" are used as settable comparison targets in the above embodiment, face parts which can be set as a comparison target are not limited thereto. For example, in addition to these face parts, "eyebrows", "hairstyle", "outline of face" and the like may be added as settable factors.

The example of setting comparison targets in the first embodiment is only an example and not limiting.

Figure 4:
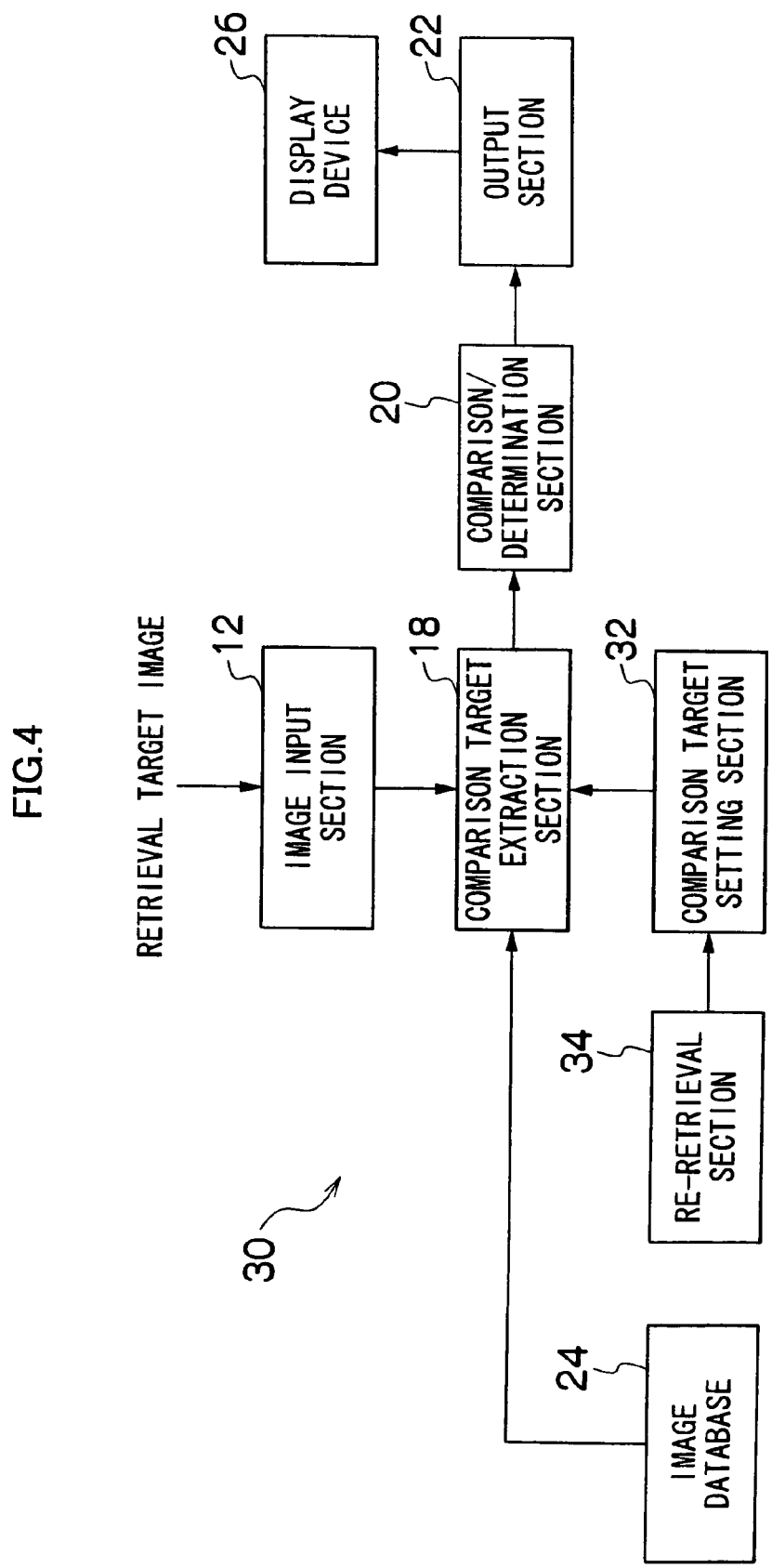
FIG. 4 is a block diagram showing the configuration of a person image retrieval apparatus of a second embodiment.

FIG. 4 is a block diagram showing a second embodiment of a face image retrieval apparatus of the present invention. As shown in FIG. 4, a face image retrieval apparatus 30 of the second embodiment is configured by an image input section 12, a comparison target extraction section 18, a comparison/determination section 20, an output section 22, a comparison target setting section 32 and a re-retrieval instruction section 34, and realized, for example, by a personal computer in which a predetermined program is incorporated.

This configuration is the same as that of the face image retrieval apparatus 10 of the first embodiment described above, except that the face image retrieval apparatus 30 is not provided with the search target detection section 14 but provided with the re-retrieval instruction section 34 and that the operation of the comparison target setting section 32 is different. Therefore, the same components as those of the face image retrieval apparatus 10 of the first embodiment described above are given the same reference numerals, and description thereof will be omitted.

The comparison target setting section 16 of the face image retrieval apparatus 10 of the first embodiment described above sets face parts to be compared based on the number of images of a group of search target images. However, in the second embodiment, the comparison target setting section 32 of the face image retrieval apparatus 30 sets face parts to be compared depending on an instruction from the re-retrieval instruction section 34. That is, "eyes" is set as a comparison target for the first search. When a re-retrieval instruction is issued by the re-retrieval instruction section 34, "eyes" and "mouth" are set as comparison targets. If a re-retrieval instruction is further issued by the re-retrieval instruction section 34, then "eyes", "mouth" and "nose" are set as comparison targets. The comparison target extraction section 18 extracts the face parts set by the comparison target setting section 32 from a detection target image and a search target image.

The re-retrieval instruction section 34 which issues a re-retrieval instruction is configured, for example, by a keyboard, and an instruction is outputted by a key operation of the keyboard. Alternatively, an instruction may be outputted by means of a click of a re-retrieval execution button shown on the display device 26.

Figure 5:
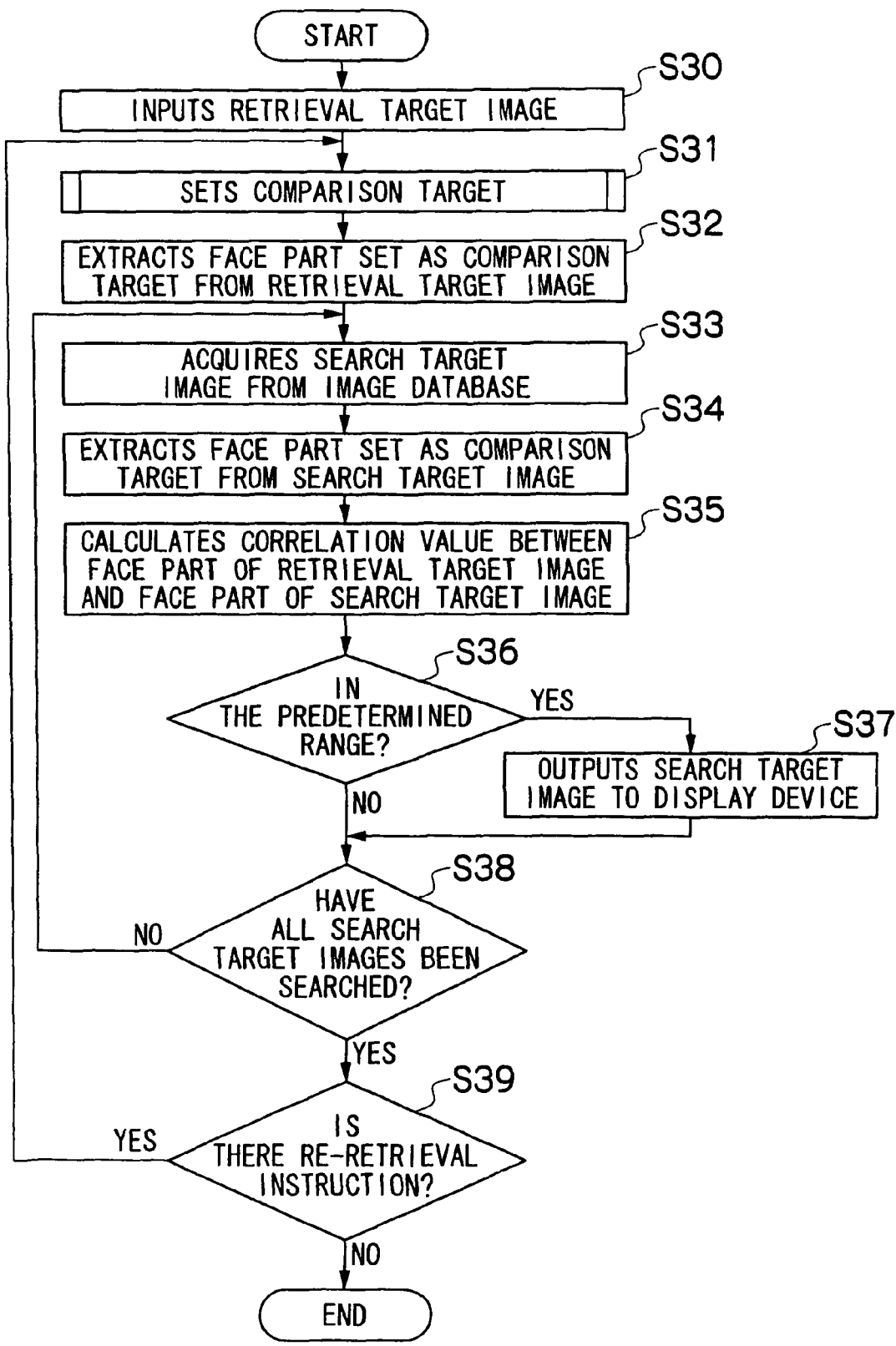
FIG. 5 is a flowchart showing the procedure of a retrieval process in the person image retrieval apparatus of the second embodiment.

Description will be now made on the procedure of a retrieval process to be performed by the face image retrieval apparatus 30 of the second embodiment which is configured as described above, with reference to the flowchart shown in FIG. 5.

First, a retrieval target image is inputted by the image input section 12 (step S30). The method of inputting the retrieval target image is similar to that for the face image retrieval apparatus 10 of the first embodiment described above.

When the retrieval target image is inputted, face parts to be compared are set by the comparison target setting section 32 (step S31).

Figure 6:
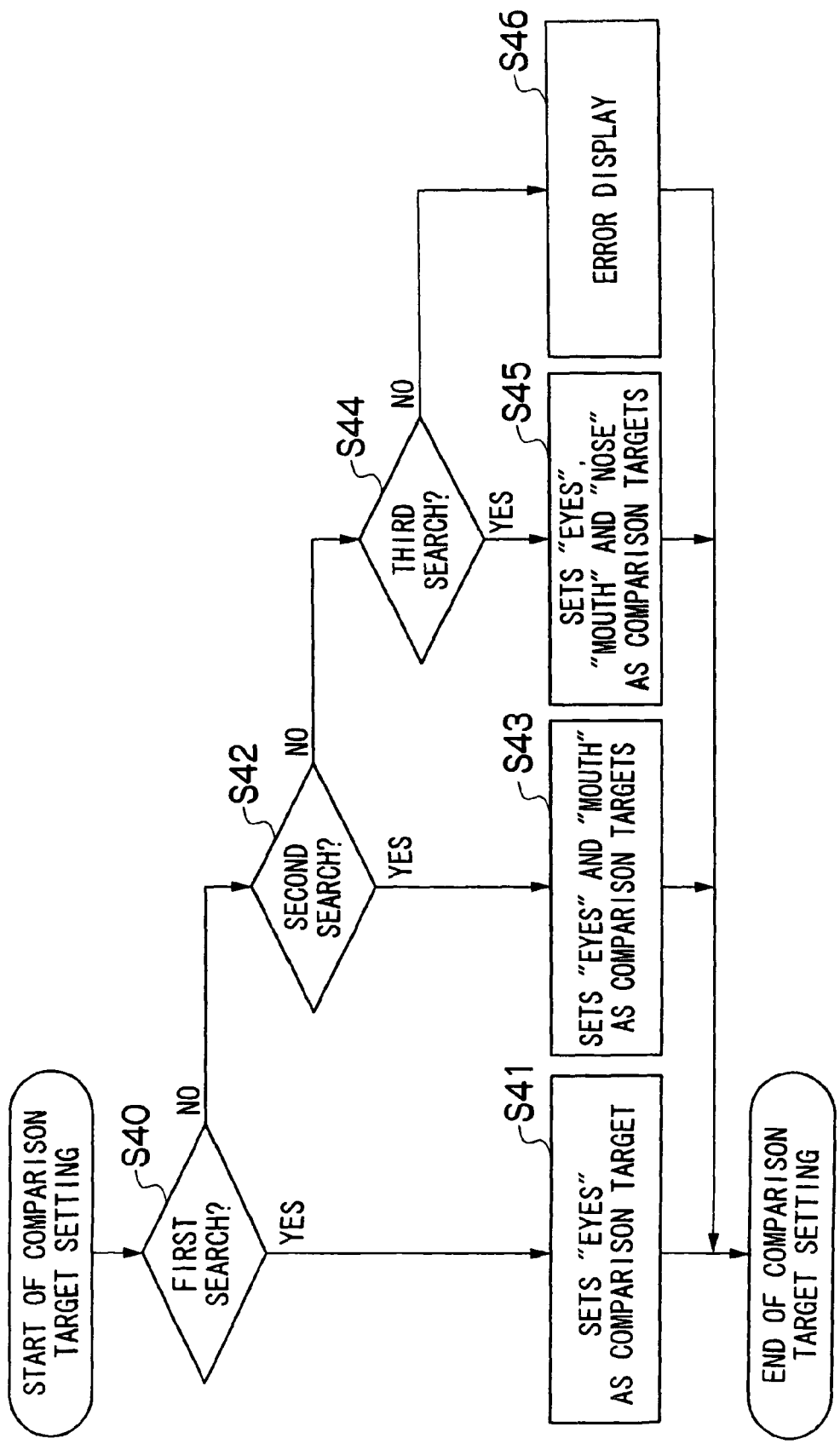
FIG. 6 is a flowchart showing the procedure of a comparison target setting process in the person image retrieval apparatus of the second embodiment.

FIG. 6 is a flowchart showing the procedure of a comparison target setting process. First, it is determined whether or not the search is the first search (step S40). If the search is determined to be the first search, then "eyes" is set as a comparison target (step S41). On the contrary, if the search is determined not to be the first search, then it is determined whether or not the search is the second search (step S42). If it the search is determined to be the second search, then "eyes" and "mouth" are set as comparison targets (step S43). If the search is determined not to be the second search, then it is further determined whether or not the search is the third search (step S44). If the search is determined to be the third search, then "eyes", "mouth" and "nose" are set as comparison targets (step S45). If the search is determined not to be the third search, then the search is determined to be the fourth or subsequent search, and an error display is outputted to the display device 26 (step S46). That is, a message is displayed on the display device 26 to the effect that it is impossible to perform re-retrieval with a higher retrieval accuracy.

In this manner, face parts to be compared are set based on the number of re-retrievals. Here, the search is the first search, and therefore "eyes" is set as a comparison target. When the comparison target has been set, the face part set as the comparison target is extracted from the inputted retrieval target image by the comparison target extraction section 18 (step S32).

Then, the first search target image is acquired from the image database 24 (step S33), and the face part set as the comparison target is extracted from the acquired search target image by the comparison target extraction section 18 (step S34).

When the face part to be compared has been extracted from the search target image, the extracted face part of the search target image is compared with the face part extracted from the retrieval target image, and it is determined whether or not both are similar to each other. That is, a correlation value between the face part extracted from the search target image and the face part extracted from the retrieval target image is calculated (step 35), and it is determined by the comparison/ determination section 20 whether or not the correlation value is in a predetermined range (step S36).

As a result, if it is determined that the correlation value between the face part extracted from the search target image and the face part extracted from the retrieval target image is in a predetermined range, then both are determined to be similar images, and the search target image determined to be a similar image is outputted from the output section 22 and displayed on the display device 26 (step 37). On the contrary, if it is determined that the correlation value between the face part extracted from the search target image and the face part extracted from the retrieval target image is not in the predetermined range, then both are determined to be non-similar images, and the process proceeds to the next step without displaying an image.

As described above, if a search target image is determined to be similar to the retrieval target image, then the search target image is outputted to the display device 26. After that, it is determined whether all the images in the image database have been searched or not (step S38). If it is determined that all the images have been searched, then the process ends.

On the contrary, if it is determined that all the images have not been searched yet, then the process returns to step S33, where the next search target image is acquired and the above similarity comparison/determination process is performed.

When all the images have been searched, the user looks at the result outputted on the display device 26 and determines whether to perform re-retrieval. If the user wants to perform retrieval with a higher accuracy, he inputs a re-retrieval instruction by means of the re-retrieval section 34.

It is determined whether a re-retrieval instruction has been inputted by the re-retrieval section 34 (step S39). If it has been inputted, the process returns to step S31, where comparison targets are set again, and the similarity comparison/determination process described above is performed with the use of the reset comparison targets.

As described above, according to the face image retrieval apparatus 30 of the second embodiment, image retrieval is performed by gradually increasing the retrieval accuracy in response to a re-retrieval instruction, and thereby it is possible to quickly retrieve a result that satisfies the user.

In the second embodiment, similarly to the face image retrieval apparatus 10 of the first embodiment, face parts settable as comparison targets are not limited to the examples described above. For example, in addition to "eyes", "mouth" and "nose", "eyebrows", "hairstyle", "outline" and the like may be added as settable factors.

Furthermore, though the present invention is realized by a personal computer with a program incorporated therein in the embodiments described above, it is also possible to incorporate a predetermined program in a computer included in a digital camera, a mobile telephone with camera or the like to realize the function.

What is claimed is:

1. A person image retrieval apparatus which retrieves an image in which the same person shown in a retrieval target image is shown, from a group of search target images, the person image retrieval apparatus comprising:
   a comparison target setting section which sets face parts to be compared;
   a comparison/determination section which compares a face of the person shown in the retrieval target image and the face of the person shown in each image of the group of search target images by the face parts set by the comparison target setting section and determines an image with a particular correlation to be a similar image;
   an output section which outputs the image determined by the comparison/determination section to be a similar image on a display device;
   a re-retrieval instruction section which instructs a re-retrieval; and
   a device where a re-retrievable number is set in advance, and when the re-retrieval is instructed by the re-retrieval instruction section over the re-retrievable number, and error display is outputted on the display device,
   wherein the comparison target setting section adds and sets a face part to be compared each time when the re-retrieval is instructed by the re-retrieval instruction section.

2. The person image retrieval apparatus of claim 1, wherein the re-retrieval instruction section comprises a keyboard.

3. The person image retrieval apparatus of claim 1, wherein the re-retrieval instruction section comprises a re-retrieval execution button.

4. The person image retrieval apparatus of claim 1, wherein re-retrieval is instructed by a key operation of a keyboard.

5. The person image retrieval apparatus of claim 1, further comprising a comparison target extraction section that extracts the face parts set by the comparison target setting section from the retrieval target image, and a target image from the group of search target images,
   wherein the comparison target extraction section extracts the face parts in response to a re-retrieval instructed by the re-retrieval instruction section.

6. The person image retrieval apparatus of claim 1, wherein a face part being set as a comparison target includes at least eyes, mouth, and nose, and
   wherein the comparison target setting section adds and sets a face part to be compared each time when the re-retrieval is instructed by the re-retrieval instruction section.

7. The person image retrieval apparatus of claim 6, further comprising a device where a re-retrievable number is set in advance, and when the re-retrieval is instructed by the re-retrieval instruction section over the re-retrievable number, an error display is outputted on the display device.

8. The person image retrieval apparatus of claim 6, wherein the comparison target setting section sets eyes as a comparison target in a first search.

9. The person image retrieval apparatus of claim 7, wherein the comparison target setting section sets eyes as a comparison target in a first search.

* * * * *